United States Patent
Koskinen et al.

(10) Patent No.: US 12,041,494 B2
(45) Date of Patent: Jul. 16, 2024

(54) SIGNALING REDUCTION AT HANDOVER OF AN IAB NODE

(71) Applicant: Nokia Technologies Oy, Espoo (FI)

(72) Inventors: Henri Markus Koskinen, Espoo (FI); Xiang Xu, Suzhou (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 337 days.

(21) Appl. No.: 17/767,965

(22) PCT Filed: Oct. 12, 2019

(86) PCT No.: PCT/CN2019/110878
§ 371 (c)(1),
(2) Date: Apr. 11, 2022

(87) PCT Pub. No.: WO2021/068257
PCT Pub. Date: Apr. 15, 2021

(65) Prior Publication Data
US 2023/0145711 A1 May 11, 2023

(51) Int. Cl.
*H04W 36/00* (2009.01)
*H04W 76/30* (2018.01)

(52) U.S. Cl.
CPC ... *H04W 36/0072* (2013.01); *H04W 36/0061* (2013.01); *H04W 76/30* (2018.02)

(58) Field of Classification Search
CPC ............ H04W 36/0072; H04W 76/30; H04W 36/0061; H04W 36/0066; H04W 36/12; H04W 36/0033
See application file for complete search history.

(56) References Cited

U.S. PATENT DOCUMENTS

2003/0227883 A1* 12/2003 Rimoni ............. H04W 36/0066
370/335
2010/0278147 A1 11/2010 Horn et al.
(Continued)

FOREIGN PATENT DOCUMENTS

CN 109275177 A 1/2019
WO WO 2019/062152 A1 * 4/2019
(Continued)

OTHER PUBLICATIONS

Huawei, "Inter IAB donor-CU topology adaptation", R3-195469, 3GPP TSG-RAN WG3 Meeting #105bis, Oct. 14-18, 2019.
(Continued)

*Primary Examiner* — Rushil P. Sampat
(74) *Attorney, Agent, or Firm* — Robert P. Michal, Esq.; Carter, DeLuca & Farrell LLP

(57) ABSTRACT

Example embodiments of the present disclosure relate to devices, methods, apparatuses and computer readable storage media of signaling reduction at handover of an IAB node. The method including sending, from a first device to a second device, a request message for a handover from the first device to the second device for a third device, the request message including a first cell configuration of the third device associated with the first device; receiving, from the second device, a response message acknowledging to the request, the response message including a resource configuration for a connection between the third device and the second device and a second cell configuration of the third device associated with the second device and sending the resource configuration to the third device. In this way, the signal overhead for the handover of an IAB node may be reduced significantly.

9 Claims, 5 Drawing Sheets

(56) References Cited

U.S. PATENT DOCUMENTS

| | | | |
|---|---|---|---|
| 2016/0192253 A1* | 6/2016 | Fischer | H04L 47/33 370/332 |
| 2019/0059027 A1 | 2/2019 | Yang et al. | |
| 2019/0223078 A1 | 7/2019 | Sirotkin et al. | |
| 2019/0281518 A1* | 9/2019 | Wu | H04W 36/0066 |
| 2020/0068448 A1* | 2/2020 | Byun | H04W 36/0009 |
| 2020/0229043 A1* | 7/2020 | Yao | H04W 36/0016 |
| 2022/0167235 A1* | 5/2022 | Geng | H04W 36/00837 |

FOREIGN PATENT DOCUMENTS

| | | |
|---|---|---|
| WO | WO 2019/137443 A1 | 7/2019 |
| WO | WO 2019/137505 A1 | 7/2019 |

OTHER PUBLICATIONS

Qualcomm Inc. et al., "IAB inter-CU Topology Adaptation for Arch 1a", R3-186457, 3GPP TSG-RAN WG3 Meeting #102, Nov. 12-16, 2018.

"Revised WID: Integrated Access and Backhaul for Nr", 3GPP TSG RAN meeting #84, RP-191558, Agenda: 9.4.11, Qualcomm, Jun. 3-6, 2019, 7 Pages.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"CR to 38.300 on Integrated Access and Backhaul for NR", 3GPP TSG-RAN WG2 Meeting #105bis, R2-1905476, Qualcomm, Apr. 8-12, 2019, 8 Pages.

"3rd Generation Partnership Project; Technical Specification Group Radio Access Network; NG-RAN; Architecture description (Release 15)", 3GPP TS 38.401, V15.5.0, Mar. 2019, pp. 1-39.

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.

"3rd Generation Partnership Project; Technical Specification GroupRadio Access Network; NR; NR and NG-RAN Overall Description; Stage 2 (Release 15)", 3GPP TS 38.300, V15.6.0, Jun. 2019, pp. 1-99.

"Msc-generator", Sourceforge, Retrieved on Dec. 12, 2023, Webpage available at : https://sourceforge.net/projects/msc-generator/.

"Discussion on network-controlled IAB migration handling", 3GPP TSG RAN WG3 Meeting #103bis, R3-191298, Agenda: 13.3.2.1, ZTE Corporation, Apr. 8-12, 2019, 5 Pages.

"Correcting some more items in the XnAP Handover Preparation and Retrieve UE Context Procedure", 3GPP TSG-RAN WG3 Meeting #100, R3-183252, Agenda: 10.5.3.2, Ericsson, May 21-25, 2018, 6 Pages.

"IAB baseline for 38.401",3GPP TSG-RAN WG3 Meeting #103, R3-19xxxx, Agenda: 13.1, Qualcomm Incorporated, Feb. 15-Mar. 1, 2019, 16 Pages.

"IEEE 802.11", Wikipedia, Retrieved on Nov. 29, 2023, Webpage available at : https://en.wikipedia.org/wiki/IEEE_802.11.

International Search Report and Written Opinion received for corresponding Patent Cooperation Treaty Application No. PCT/CN2019/110878, dated Jun. 29, 2020, 9 pages.

Extended European Search Report received for corresponding European Patent Application No. 19948330.6, dated May 2, 2023, 8 pages.

* cited by examiner

SIGNALING REDUCTION AT HANDOVER OF AN IAB NODE

CROSS REFERENCE TO RELATED APPLICATION

This patent application is a U.S. National Stage application of International Patent Application Number PCT/CN2019/110878 filed Oct. 12, 2019, which is hereby incorporated by reference in its entirety.

FIELD

Embodiments of the present disclosure generally relate to the field of telecommunication and in particular, to a device, method, apparatus and computer readable medium of signaling reduction at handover of an IAB node.

BACKGROUND

Integrated Access and Backhaul (IAB) enables wireless relaying for New Radio (NR) access by using NR for backhauling. A relaying node is referred to as an IAB-node. The terminating node of NR backhauling on network side is referred to as an IAB-donor. The IAB-donor represents a gNB with additional functionality to support IAB. Backhauling may occur via a single or via multiple hops.

An IAB node may change its attachment point from a source IAB-donor to a target IAB-donor different from the source IAB-donor. Such behaviour may be referred to as inter-gNB handover of an IAB node. Even though IAB nodes are initially assumed stationary, network-controlled topology adaptation may be based on handover procedure. Furthermore, mobile IAB nodes are also expected in the development.

SUMMARY

In general, example embodiments of the present disclosure provide a solution of signaling reduction at handover of an IAB node.

In a first aspect, there is provided a method implemented at a first device. The method comprises sending, from a first device to a second device, a request message for a handover from the first device to the second device for a third device, the request message including a first cell configuration of the third device associated with the first device; receiving, from the second device, a response message acknowledging to the request, the response message including a resource configuration for a connection between the third device and the second device and a second cell configuration of the third device associated with the second device; and sending the resource configuration to the third device.

In a second aspect, there is provided method implemented at a second device. The method comprises receiving, at a second device and from a first device, a request message for a handover from the first device to a second device for a third device, the request message including a first cell configuration of the third device associated with the first device; sending a response message acknowledging to the request, the response message including a resource configuration for a connection between the third device and the second device and a second cell configuration of the third device associated with the second device and receiving, from the third device, a second message indicating that a connection between the third device and the second device has been successful established.

In a third aspect, there is provided a method implemented at a third device. The method comprises receiving, at a third device and from a first device, a resource configuration for a connection between the third device and a second device; establishing the connection at least based on the resource configuration; and sending, to the second device, a second message indicating that the connection has been successfully established, to cause the second device to remove at least one original cell to be removed from the third device from a set of potential target cells for a further handover to the first device based on a first cell configuration of the third device associated with the first device.

In a fourth aspect, there is provided a first device. The first device comprises at least one processor and at least one memory including computer program code. The at least one memory and the computer program code are configured to, with the at least one processor, cause the first device to perform the method of the first aspect.

In a fifth aspect, there is provided a second device. The second device comprises at least one processor and at least one memory including computer program code. The at least one memory and the computer program code are configured to, with the at least one processor, cause the second device to perform the method of the second aspect.

In a sixth aspect, there is provided a method implemented at a third device. The second device comprises at least one processor and at least one memory including computer program code. The at least one memory and the computer program code are configured to, with the at least one processor, cause the second device to perform the method of the third aspect.

In a seventh aspect, there is provided a computer readable medium comprising a computer program for causing an apparatus to perform at least the method according to the first aspect.

In an eighth aspect, there is provided a computer readable medium comprising a computer program for causing an apparatus to perform at least the method according to the second aspect.

In a ninth aspect, there is provided a computer readable medium comprising a computer program for causing an apparatus to perform at least the method according to the third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
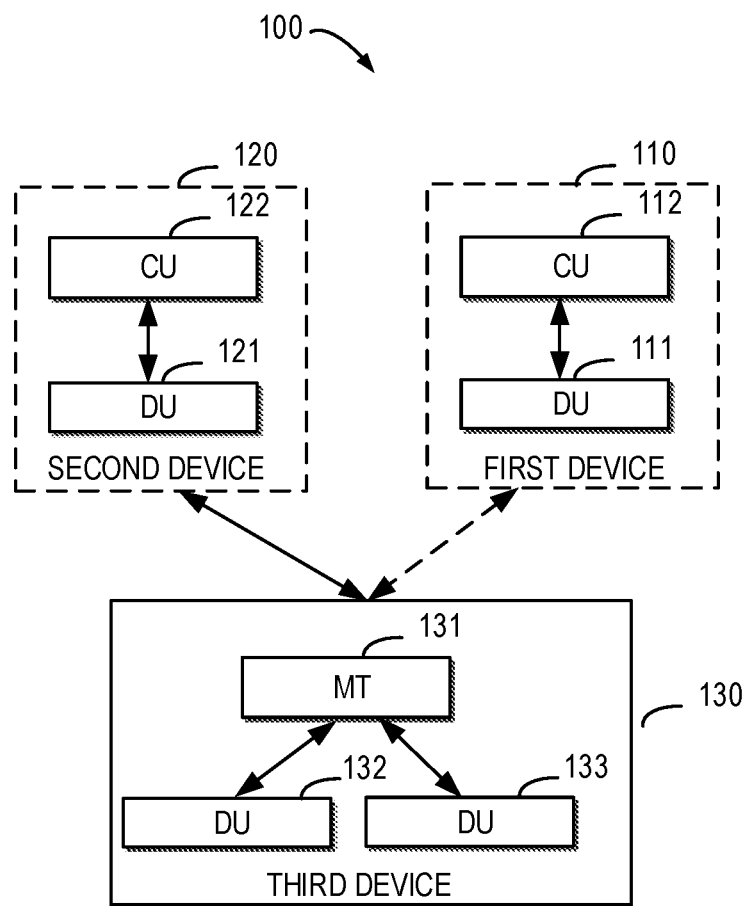
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUS (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The communication network 100 includes a first device 110, a second device 120 and a third device 130. In this example, the third device 120 is illustrated as an IAB-node, the first device 110 and the second device 120 are illustrated as IAB-donors (such as gNBs) serving the IAB-node. It is to be understood that the number of the first device, second device and the third device is given for the purpose of illustration without suggesting any limitations to the present disclosure. The communication network 100 may include any suitable number of first, second and third devices adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

The third device 130 may comprises an MT 131, a DU 132 and a second DU 133. Via the MT 131, the third device 130 connects to the second device 120 or the first device 110. Via the DUs 132 and 133, the third device 130 establishes RLC-channels to terminal devices and to MTs of downstream IAB-nodes (not shown). Each of the first DU 132 and the second DU 133 has F1-C connection only with one IAB-donor CU-CP. For example, the first DU 132 may have a first F1 interface with the CU 122 in the second device 120, and the second DU 133 may have a second F1 interface with the CU 112 in the first device 110. In another embodiment, the third device 130 may only have one DU. Up to the IAB's implementation, the DU in the third device 130 may dynamically switch the F1 interface between the connection with the CU 122 in the second device 120, and the connection with the CU 112 in the first device 110. To easy description, the DU which connects with the CU 122 is termed as DU 132, and the DU which connects with the CU 112 is termed as DU 133.

The second device 120 comprises at least one DU 121 to support terminal devices and MTs of downstream one or more IAB-nodes. The second device 120 also comprises a CU 122 for interfacing the DUs of IAB-nodes and for its own DU 121. Similarly, the first device 110 comprises at least one DU 111 to support terminal devices and MTs of downstream one or more IAB-nodes. The first device 110 also comprises a CU 112 for interfacing the DUs of IAB-nodes and for its own DU 111. It is assumed that a given DU on an IAB-node is served by only one IAB-donor. This IAB-donor may change through topology adaptation.

It should be understood that although the DU 121 and the CU 122 is illustrated to be implemented on a single entity, the DU 121 and the CU 122 may be implemented on separated entities. Similarly, the DU 111 and the CU 112 may be implemented on a single entity or separated entities.

In some example embodiments, the DU 132 in the third device 130 connects to the CU 122 in the second device 120 or the CU 112 in the first device 110 using a F1 interface. F1 User plane interface (F1-U) runs over RLC channels on the wireless backhaul between the MT 131 in the third device 130 and the DU 121 in the second device 120 or the DU 111 in the first device 110.

As mentioned above, an IAB node may change its attachment point from a source IAB-donor to a target IAB-donor different from the source IAB-donor. Such behaviour may be referred to as inter-gNB handover of an IAB node. Even though IAB nodes are initially assumed stationary, network-controlled topology adaptation may be based on handover procedure. Furthermore, mobile IAB nodes are also expected in the development.

For example, the third device 130 has an attachment point to the CU 112 in the first device 110. Thus, the first device 110 is also referred to as a source IAB-donor. During the handover procedure, the third device 130 changes its attachment point from the CU 112 in the first device 110 to the CU 122 in the second device 110. Thus, the second device 120 is also referred to as a target IAB-donor.

For the purpose of handling mobility of terminals, gNBs connected by the Xn interface keep each other informed of the cells that they provide. Updates to the cells that a gNB provides are signalled to other gNBs using the NG-RAN node Configuration Update in Xn Application Protocol (AP) signalling protocol.

When the MT part of an IAB node (for example, the MT 131 in the third device 130) is commanded handover from a source donor gNB (for example, the first device 110) to a target donor gNB ((for example, the second device 120), the radio cells provided by its IAB node DU (for example, the DU 132 in the third device 130) functionality may need to undergo some changes. For example, the NR Cell Global Identities (CGI) of those radio cells may need to change because part of that NR CGI is the gNB Identifier. In another embodiment, the Physical Cell Identifier (PCI) of those radio cells need to change.

According to the definition of the present XnAP procedures, every inter-gNB handover of an IAB node would need to come with the following XnAP procedures, i.e. Handover preparation (for the IAB MT; UE-associated XnAP procedure) and NG-RAN node Configuration Update (non-UE-associated XnAP procedure).

Additionally, in conjunction with the handover of the IAB node, the DU in the third device 130 need to setup the F1 interface with the target donor gNB. In addition, the target donor gNB needs to know, after which point in time it can issue handover commands to UEs served by the IAB node (those handover commands may be needed at least because the target gNB is the new network-side PDCP-termination point for those UEs). An F1AP procedure between the IAB DU and the target donor gNB may be therefore required.

Specifically, in a conventional way, a handover request message for an IAB node may be transmitted from a source IAB donor to a target IAB donor according to the XnAP, the target IAB donor may respond to the handover request with a handover request acknowledge message containing RRC reconfiguration information, i.e. handover command, for the IAB node, which may be referred to as the UE-associated XnAP procedure, as mentioned above.

Then the source IAB donor may command the IAB node to block the radio cells with given NR CGIs associated with the source IAB donor and transfer the RRC reconfiguration information received from the target IAB donor to the IAB node. Once the RRC reconfiguration has completed at the IAB node, the IAB may transmit an indication of the completion of the RRC reconfiguration to the target donor node.

In conjunction with the RRC reconfiguration, the DU in the IAB node setup the F1 interface with target donor, and the target donor node may command the IAB node to activate and assign radio cell with new NR CGIs associated with the target donor node according to F1AP. Once the IAB node confirms the activation and the new NR CGIs, the target IAB node may transmit the update information concerning the NG-RAN node configuration indicating the updated cell information to the source IAB donor node according to the XnAP and the source IAB donor node may response the update information with removed NR CGIs, which may be referred to as non-UE-associated XnAP procedure, as mentioned above.

The F1 interface setup with target IAB donor node, and two XnAP procedures may cause a considerable signalling overhead for the handover of IAB node. Therefore, the embodiments of the present disclosure proposes a method of signalling reduction for the handover, which intends to merge the required UE-associated Handover-preparation procedure and the non-UE-associated NG-RAN node Configuration Update procedure, as well as the transferring the IAB-DU configuration information during the handover preparation procedure to reduce the F1 interface setup.

Figure 2:
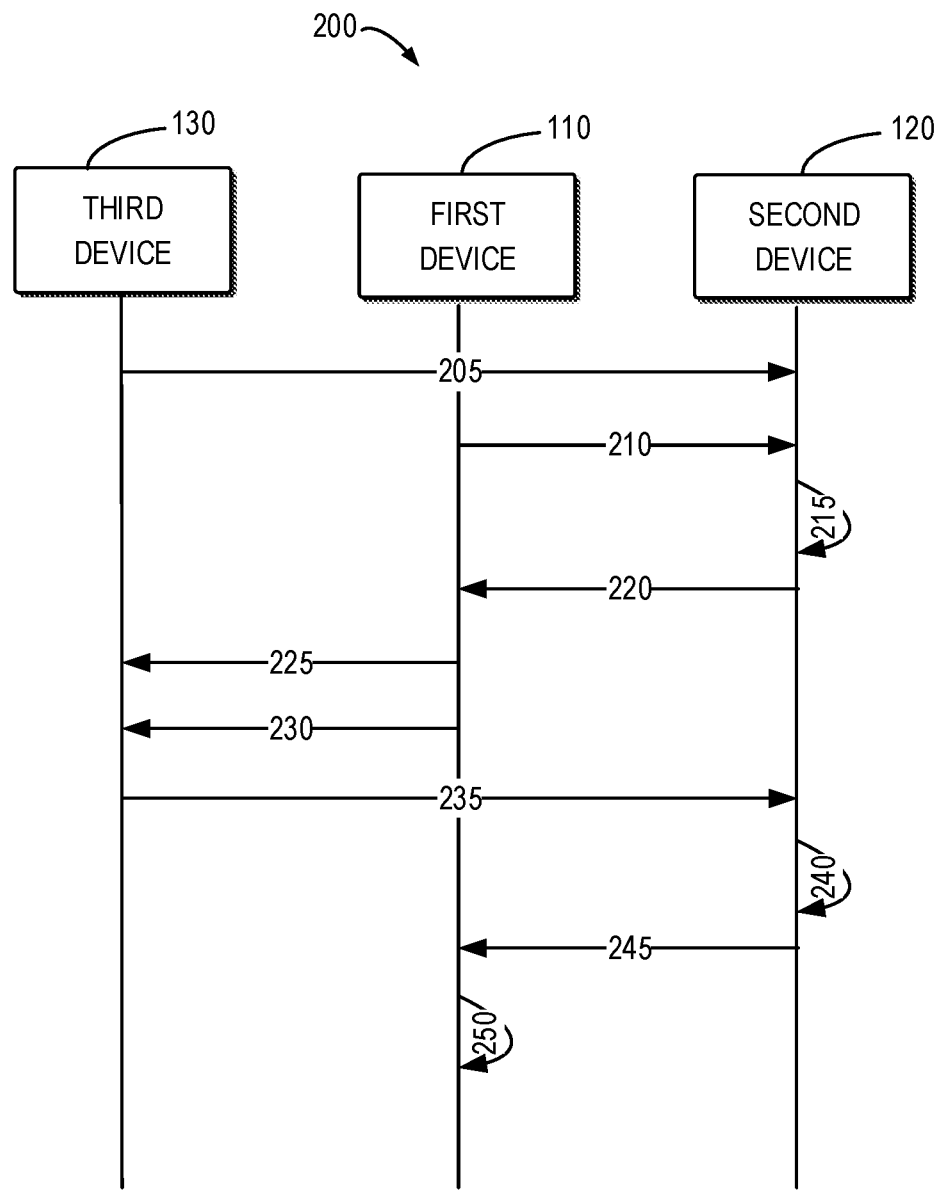
FIG. 2 shows a signaling chart illustrating a process of signaling reduction at handover of an IAB node according to some example embodiments of the present disclosure.

Principle and implementations of the present disclosure will be described in detail below with reference to FIGS. 2 to 5. FIG. 2 shows a signaling chart illustrating a process 200 signaling reduction at handover of an IAB node according to some example embodiments of the present disclosure. For the purpose of discussion, the process 200 will be described with reference to FIG. 1. The process 200 may involve the first device 110, the second device 120 and the third device 130 as illustrated in FIG. 1. It would be appreciated that although the process 200 has been described in the communication system 100 of FIG. 1, this process may be likewise applied to other communication scenarios.

As shown in FIG. 2, the third device 130 may pre-establish 205 a communication interface with the second device 120. In some example embodiments, the communication interface is F1 interface. It should be appreciated that F1 interface is just an example, any appropriate communication interface may be used between the third device 130 and the first device 110. In some other example embodiments, this step may not be performed, for example, when the third device 130 only has one DU.

In some example embodiments, in order to establish the communication interface, the third device 130 transmits a request message for establishing the communication interface to the first device 110. The first device 110 forwards the request to the second device 120. In response to receiving the request from the first device 110, the second device 120 establishes the communication interface. Then, the second device 120 transmits to the first device 110 a response indicating establishment of the communication interface. The first device 110 forwards the response to the third device 130.

In the example embodiments where the communication interface is F1 interface, the request message for establishing the communication interface may be an F1 SETUP REQUEST message, and the response may be F1 SETUP RESPONSE message.

With continued reference to FIG. 2, the handover may be initiated by the first device 110. The first device 110 transmits 210 an Xn Handover Request message to the second device 120 to initiate handover preparation. In this Xn Handover Request message, a cell configuration of the third device 130 associated with the first device 110 is included.

In some other example embodiments, the handover may be performed via the NG interface, for example, when there is no Xn interface between the first device 110 and the second device 120, or the Xn interface is available but cannot be used for Xn-based handover due to configuration.

In the example embodiments, the cell configuration information of the third device 130 associated with the first device 110 may comprise an indication of the NR CGIs of at least one existing cell for the third device 130. The cell configuration information may also include the detailed information for the serving cells of the third device 130. The cell configuration information may include the DU identity, the DU name, the Tracking Area Code (TAC), the PLMN ID, the NR mode information, the Physical Cell Identifier (PCI), the system information, RRC version, and other information that are normally included in the F1 SETUP REQUEST message. The at least one existing cell may be removed from the third device 130 during the handover procedure, or may be removed from the third device 130 after the handover is completed.

Once the second device 120 receives the Xn Handover Request message from the first device 110, the second device 120 generates 215 a Xn Handover Request Acknowledge message with a resource configuration for the third device 130 based on the request. The Xn Handover request Acknowledge message is transmitted from the second device 120 to the first device 110 in response to the Xn Handover request message. In the example embodiments, the resource configuration may be referred to as information concerning "RRC reconfiguration."

The second device 120 may also configure a new cell configuration (for example, a second cell configuration) for the third device 130 to be adopted after the completion of the handover procedure.

In the example embodiments, the new cell configuration may comprise the NR CGIs of cells, the new PCIs, the new system information, the cells to be activated and other configuration information, to be assigned to the third device 130. The second device 120 may determine the at least one new cell intended to be assigned to the third device 130 and generate the new cell configuration including the new identifier of the at least one new cell.

When the second device transmits 220 the Xn Handover Request Acknowledge message with a resource configuration, the new cell configuration may also be transmitted with the resource configuration to the first device 110 via a message, for example, a NG Handover Request Acknowledge message.

If the first device 110 receives the resource configuration, the first device 110 may command 225 the third device 130 to block the radio cells with given NR CGIs associated with the first device 110 and transmits 230 the resource configuration received from the second device 120 to the third device 130. In some example embodiments, the resource configuration may be transmitted by a RRC Reconfiguration message. In some other example embodiments, the action 225 and the action 230 may be combined in one step.

In some example embodiment, the RRC Reconfiguration message may be transmitted from the DU 111 in the first device 110 to the MT 131 in the third device 130. In some example embodiments, the RRC Reconfiguration message may include the new cell configuration including NR CGIs, the new PCIs, the new system information, the cells to be activated and other configuration information that are normally included in a F1 SETUP RESPONSE message, of at least one new cells assigned to the third device 130, the at least one new cell may be provided by the DU 132 under the second device 120. The third device 130 saves the received new cell configuration, which is associated with the second device 120.

Once the RRC reconfiguration has completed at the third device 130, the third device 130 transmits 235 a message indicating the completion of the RRC reconfiguration to the second device 120. In some example embodiments, the message may be a RRC Reconfiguration Complete message. In some example embodiment, the RRC Reconfiguration Complete message may include an indication for confirming an adoption of new cell configuration after the completion of the handover. The third device 130 also starts to use the saved cell information configuration associated with the second device 120.

If the second device 120 receives the message indicating the completion of the RRC reconfiguration from the third device 130, the second device 120 may determine 240 the completion of the handover procedure. That is, the reception of message confirming the completion of the RRC reconfiguration by the third device 130 may be considered as a point in time when the handover should be considered successfully completed for the third device 130. In some example embodiments, the reception of message confirming the completion of the RRC reconfiguration by the third device 130 may be considered as a point in time when the new cell configuration provided by the second device 120 have been accepted by the third device 130.

If the second device 120 receives the message indicating the completion of the RRC reconfiguration from the third device 130, i.e. the connection between the third device 130 and the second device 120 has been successful established, the second device 120 removes at least one original cell from a set of potential target cells for a further handover to the first device. The second device 120 may determine the at least one original cell, which shall be removed from the third device 130, based on the original cell configuration received from the first device 110 via the handover request.

Furthermore, the second device 120 may transmit 245 an indication message indicating that the handover was successful to the first device 110, the first device 110 may determine 250 at least one available cell as a potential target cell for a further handover to the second device 120 based on the new cell configuration received from the second device 120 in the handover request acknowledge message.

In some example embodiments, the second device 120 may also transmit a further indication for the first device 110 to release a context associated with the third device 130. The first device then may determine the completion of the handover procedure once this indication is received. That is, the reception of indication for releasing a context associated with the third device may be considered as a point in time when the handover should be considered successfully completed for the first device 110, i.e. a source IAB donor. In some example embodiments, the reception of indication for releasing a context associated with the third device may also be considered as a point in time when the context for the connected terminal devices and child IAB nodes can be released in the first device 110.

In this way, the signal overhead for the handover of an IAB node may be reduced significantly.

Figure 3:
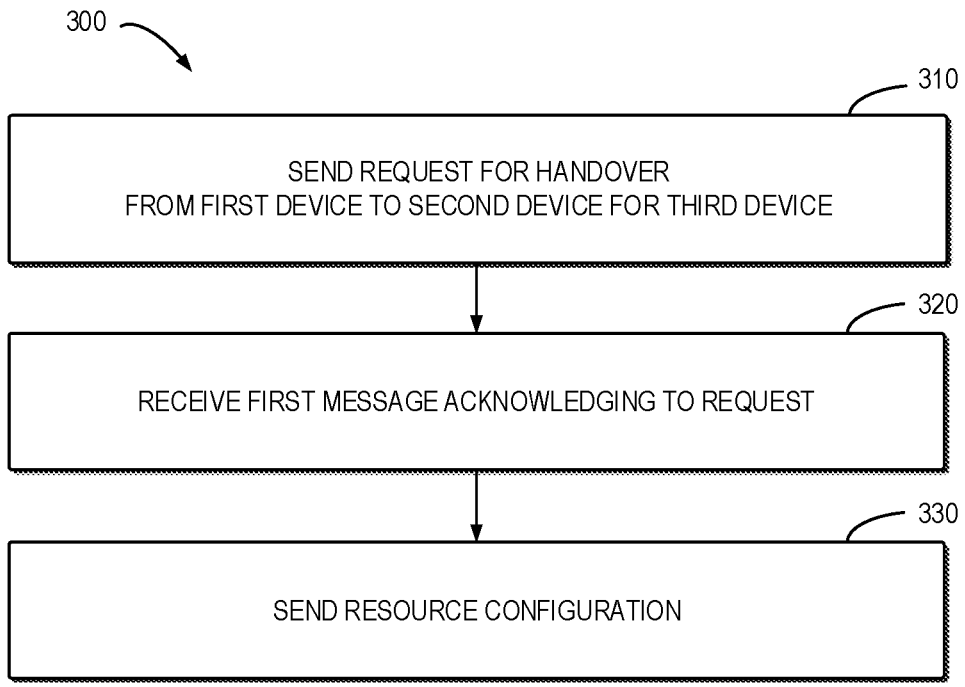
FIG. 3 shows a flowchart of a method implemented at a first device in accordance with some example embodiments of the present disclosure.

FIG. 3 shows a flowchart of an example method 300 implemented at a device in accordance with some example embodiments of the present disclosure. For the purpose of discussion, the method 300 will be described from the perspective of the first device 110 with reference to FIG. 1.

At 310, the first device 110 sends, to a second device 120, a request message for a handover from the first device 110 to the second device 120 for a third device 130, the request message including a first cell configuration of the third device 130 associated with the first device 110.

At 320, the first device 110 receives, from the second device, a response message acknowledging to the request, the response message including a resource configuration for a connection between the third device and the second device and a second cell configuration of the third device associated with the second device.

In some example embodiments, the first cell configuration may comprise an identifier of at least one original cell to be removed from the third device during the handover. The second cell configuration comprises an identifier of at least one new cell to be provided by the third device after the completion of the handover.

In some example embodiments, the second cell configuration is different from the first cell configuration.

At 330, the first device 110 sends the resource configuration to the third device 130. The resource configuration is transmitted through an RRC Reconfiguration message.

In some example embodiments, the first device 110 sends the second cell configuration with the resource configuration to the third device 130.

In some example embodiments, if the first device receives an indication message indicating that the handover was successful, the first device may determine at least one available cell as a potential target cell for a further handover to the second device.

In some example embodiments, the indication message may further comprise an indication for the first device to release a context associated with the third device.

Figure 4:
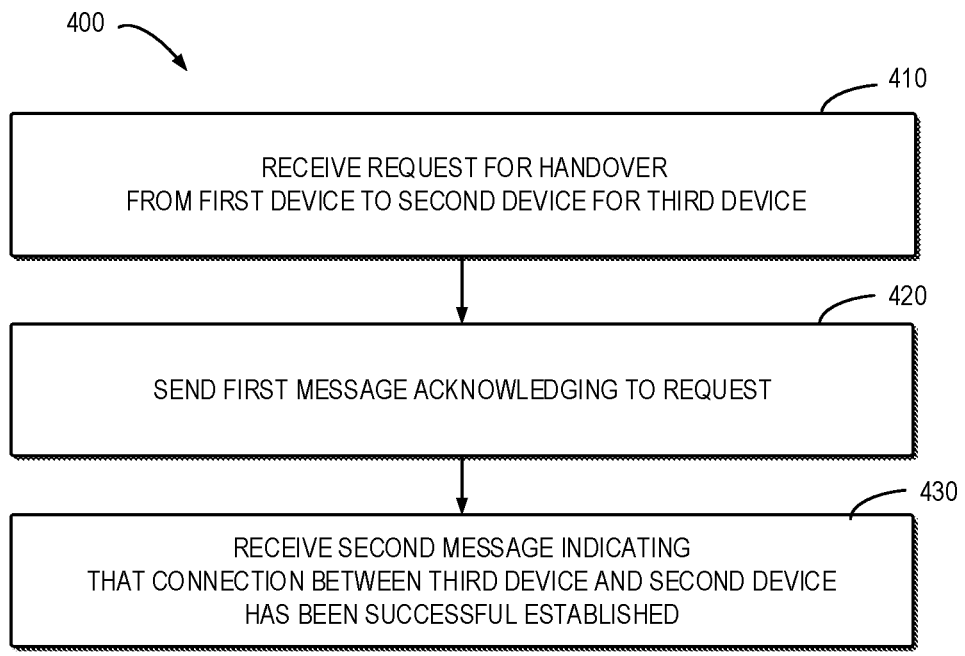
FIG. 4 shows a flowchart of a method implemented at a second device in accordance with some example embodiments of the present disclosure.

FIG. 4 shows a flowchart of an example method 400 implemented at a device in accordance with some example embodiments of the present disclosure. For the purpose of discussion, the method 400 will be described from the perspective of the second device 120 with reference to FIG. 1.

At 410, the second device 120 receives, from a first device, a request message for a handover from the first device to a second device for a third device, the request including a first cell configuration of the third device associated with the first device.

At 420, the second device 120 sends a response message acknowledging to the request, the response message including a resource configuration for a connection between the third device and the second device and a second cell configuration of the third device associated with the second device.

In some example embodiments, the second cell configuration is different from the first cell configuration.

At 430, the second device 120 receives, from the third device 130, a message indicating that a connection between the third device 130 and the second device 120 has been successfully established.

In some example embodiments, the first cell configuration may comprise an identifier of at least one original cell to be removed from the third device during the handover. The second cell configuration comprises an identifier of at least one new cell to be provided by the third device after the completion of the handover.

In some example embodiments, if the second device 120 receives, from the third device 130, the message indicating that a connection between the third device 130 and the second device 120 has been successfully established, the second device 120 removes at least one original cell to be removed from the third device from a set of potential target cells for a further handover to the first device based on the first cell configuration.

In some example embodiments, the second device 120 sends an indication message indicating that the handover was successful to the first device 110.

In some example embodiments, the second device 120 may send an indication for the first device 110 to release the context associated with the third device 130.

In some example embodiments, the second device 120 may receive, from the third device 130, a confirmation of an adoption of the second cell configuration.

Figure 5:
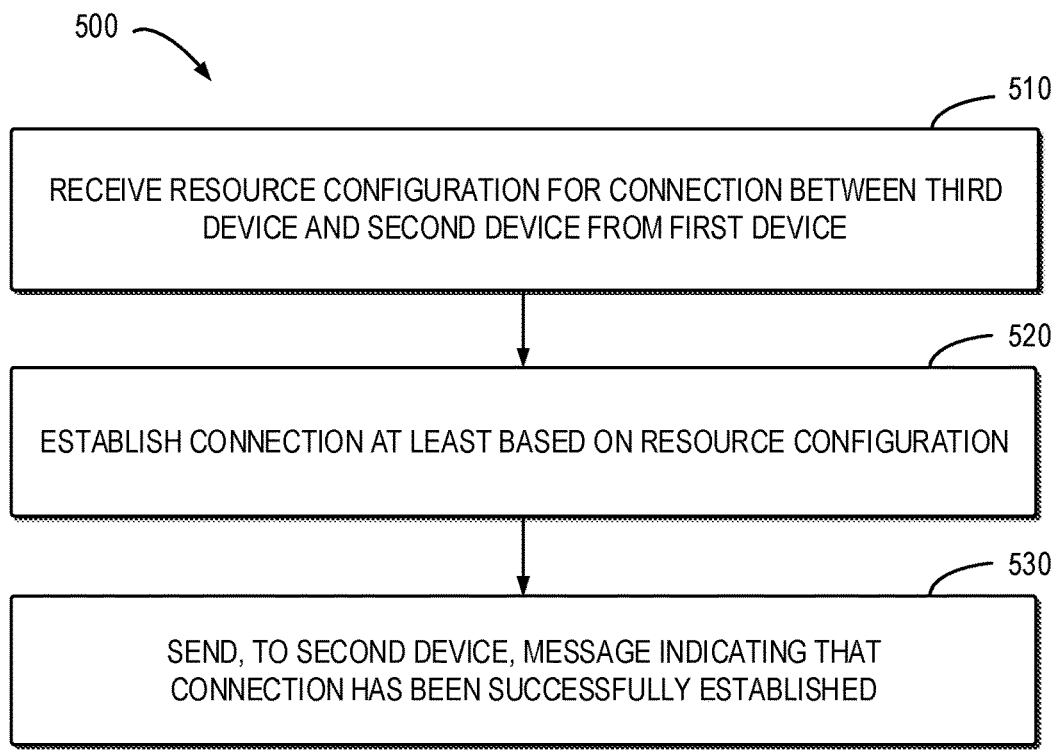
FIG. 5 shows a flowchart of a method implemented at a third device in accordance with some example embodiments of the present disclosure.

FIG. 5 shows a flowchart of an example method 500 implemented at a device in accordance with some example embodiments of the present disclosure. For the purpose of discussion, the method 500 will be described from the perspective of the third device 130 with reference to FIG. 1.

At 510, the third device 130 receives a resource configuration for a connection between the third device and a second device from a first device.

At 520, the third device 130 establishes the connection at least based on the resource configuration.

At 530, the third device 130 sends, to the second device, a message indicating that the connection has been successfully established, to cause the second device 120 to remove at least one original cell to be removed from the third device 130 from a set of potential target cells for a further handover to the first device 110 based on a first cell configuration of the third device 130 associated with the first device 110.

In some example embodiments, the third device 130 may further receive, with the resource configuration, a second cell configuration of the third device associated with the second device.

In some example embodiments, the second cell configuration may be different from a first cell configuration of the third device associated with the first device.

In some example embodiments, the third device 130 may send, to the second device 120, a confirmation of an adoption of the second cell configuration.

In some example embodiments, an apparatus capable of performing any of the method 300 (for example, the first device 110) may comprise means for performing the respective steps of the method 300. The means may be implemented in any suitable form. For example, the means may be implemented in a circuitry or software module.

In some example embodiments, the apparatus comprises means for sending, from a first device to a second device, a request message for a handover from the first device to the second device for a third device, the request message including a first cell configuration of the third device associated with the first device; means for receiving, from the second device, a response message acknowledging to the request, the response message including a resource configuration for a connection between the third device and the second device and a second cell configuration of the third device associated with the second device; means for sending the resource configuration to the third device and means for in response to receiving, from the second device, an indication message indicating that the handover was successful, determining, based on the second cell configuration, at least one available cell as a potential target cell for a further handover to the second device.

In some example embodiments, an apparatus capable of performing any of the method 400 (for example, the second device 120) may comprise means for performing the respective steps of the method 400. The means may be implemented in any suitable form. For example, the means may be implemented in a circuitry or software module.

In some example embodiments, the apparatus comprises means for receiving, from a first device, a request message for a handover from the first device to a second device for a third device, the request message including a first cell configuration of the third device associated with the first device; means for sending a response message acknowledging to the request, the response message including a resource configuration for a connection between the third device and the second device and a second cell configuration of the third device associated with the second device; means for in response to receiving, from the third device, a second message indicating that a connection between the third device and a second device has been successful established, removing at least one original cell to be removed from the third device from a set of potential target cells for a further handover to the first device based on the first cell configuration; and means for sending, to the first device, an indication message indicating that the handover was successful.

In some example embodiments, an apparatus capable of performing any of the method 500 (for example, the third device 130) may comprise means for performing the respective steps of the method 500. The means may be implemented in any suitable form. For example, the means may be implemented in a circuitry or software module.

In some example embodiments, the apparatus comprises: means for receiving, at a third device and from a first device, a resource configuration for a connection between the third device and a second device; means for establishing the connection at least based on the resource configuration; and means for sending, to the second device, a second message indicating that the connection has been successfully established, to cause the second device to remove at least one original cell to be removed from the third device from a set of potential target cells for a further handover to the first device based on a first cell configuration of the third device associated with the first device.

Figure 6:
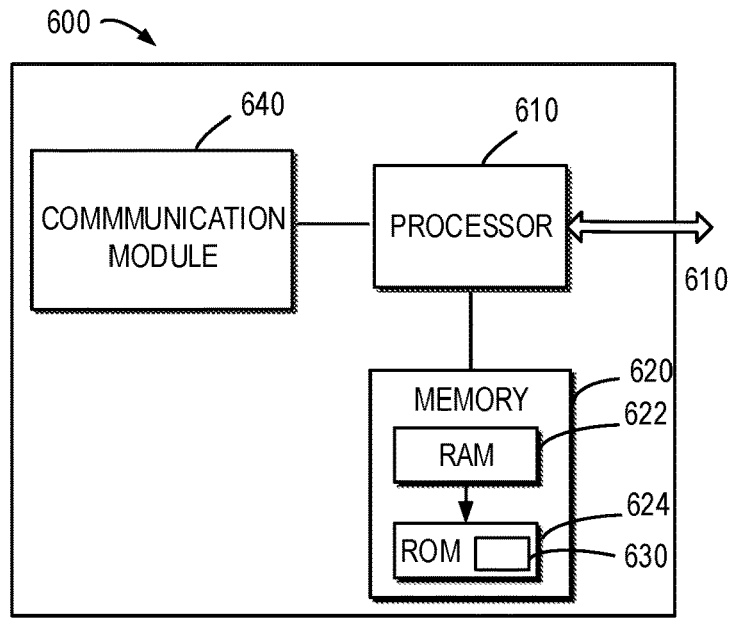
FIG. 6 illustrates a simplified block diagram of an apparatus that is suitable for implementing some other embodiments of the present disclosure.

FIG. 6 is a simplified block diagram of a device 600 that is suitable for implementing embodiments of the present disclosure. The device 600 may be provided to implement the communication device, for example the first device 110, the second device 120, the third device 130 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
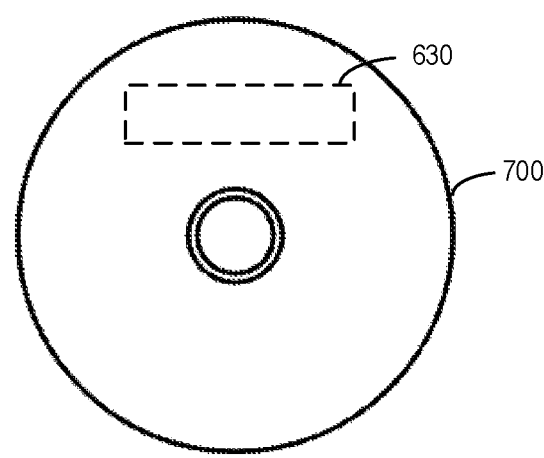
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 500 as described above with reference to FIGS. 3, 4 and 5. Generally, program modules include routines, programs, libraries, objects, classes, components, data structures, or the like that perform particular tasks or implement particular abstract data types. The functionality of the program modules may be combined or split between program modules as desired in various embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first device and the method comprising:
   sending, to a second device, a request message for a handover from the first device to the second device for a third device, the request message including a first cell configuration of the third device associated with the first device; and
   receiving, from the second device, a response message acknowledging to the request message, the response message including a resource configuration for a connection between the third device and the second device and a second cell configuration of the third device associated with the second device;
   sending the resource configuration to the third device; and
   in response to receiving, from the second device, an indication message indicating that the handover was successful, determining, based on the second cell configuration, at least one available cell as a potential target cell for a further handover to the second device;
   wherein the indication message comprises an indication for the first device to release a context associated with the third device.

2. The method of claim 1, wherein the second cell configuration is different from the first cell configuration.

3. The method of claim 1, wherein the first cell configuration comprises an identifier of at least one original cell to be removed from the third device during the handover, and wherein the second cell configuration comprises an identifier of at least one new cell to be provided by the third device after the completion of the handover.

4. The method of claim 1, further comprising:
   sending, to the third device, the second cell configuration with the resource configuration.

5. A method, performed by a second device and the method comprising:
   receiving, from a first device, a request message for a handover from the first device to a second device for a third device, the request message including a first cell configuration of the third device associated with the first device; and
   sending a response message acknowledging to the request message, the response message including a resource configuration for a connection between the third device and the second device and a second cell configuration of the third device associated with the second device;
   receiving, from the third device, a message indicating that a connection between the third device and the second device has been successfully established; and
   sending, to the first device, an indication message indicating that the handover was successful;
   wherein sending the indication message comprises sending an indication for the first device to release a context associated with the third device.

6. The method of claim 5, wherein the second cell configuration is different from the first cell configuration.

7. The method of claim 5, further comprising:
   in response to receiving the message from the third device, removing at least one original cell to be removed from the third device from a set of potential target cells for a further handover to the first device based on the first cell configuration.

8. The method of claim 5, wherein the first cell configuration comprises an identifier of at least one original cell to be removed from the third device during the handover, and wherein the second cell configuration comprises an identifier of at least one new cell to be provided by the third device after the completion of the handover.

9. The method of claim 5, further comprising:
   receiving, from the third device, a confirmation of an adoption of the second cell configuration.

* * * * *